United States Patent [19]

Tetart et al.

[11] Patent Number: 5,025,077
[45] Date of Patent: Jun. 18, 1991

[54] COMPOSITION FOR GLUING DISCONTINUOUS MINERAL FIBERS IN ORDER TO OBTAIN INSULATION PRODUCTS

[75] Inventors: Serge Tetart, Nogent sur Oise; Bernard Lericque, Rantigny, both of France

[73] Assignee: Isover Saint-Gobain, Courbevoie, France

[21] Appl. No.: 226,202

[22] Filed: Jul. 28, 1988

[30] Foreign Application Priority Data

Aug. 3, 1987 [FR] France ................................ 87 10978

[51] Int. Cl.$^5$ ............................................... C08G 59/00
[52] U.S. Cl. ......................................... 528/86; 528/88; 528/93; 528/110; 528/113; 528/119; 528/121; 528/232; 528/243; 528/259; 528/260; 528/261
[58] Field of Search ...................... 528/86, 88, 93, 110, 528/113, 119, 121, 232, 243, 259, 260, 261

[56] References Cited

U.S. PATENT DOCUMENTS 2,564,925  8/1951  Pollard ................................ 524/215
4,461,804  7/1984  Motsinger et al. ................. 428/288

FOREIGN PATENT DOCUMENTS 0219427  4/1987  European Pat. Off. .
1155004  6/1969  United Kingdom .

Primary Examiner—John Kight
Assistant Examiner—Samuel A. Acquah
Attorney, Agent, or Firm—Oblon, Spivak, McCelland, Maier & Neustadt

[57] ABSTRACT

A glue composition comprises a heat-hardenable resin, urea and possibly one or several glue additives, and is characterized by the presence of an additional gluing compound is polyol having a functionality of at least equal to three. This glue can be used for mineral fibers in the manufacture of insulation products having improved properties.

13 Claims, No Drawings

COMPOSITION FOR GLUING DISCONTINUOUS MINERAL FIBERS IN ORDER TO OBTAIN INSULATION PRODUCTS

BACKGROUND OF THE INVENTION

1. Field of the Invention

The present invention relates to a composition for gluing discontinuous mineral fibers, in particular glass fibers. It also relates to insulation products, treated using said composition, which in particular have a white color and which are particularly useful in the form of shells for pipe insulation or cushions for the manufacture of molded products.

2. Background of the Prior Art

Mineral fiber-based insulation products can be formed from fibers obtained by various methods. For example, the technique known as centrifugal drawing can be mentioned, in which the molten material is placed into a centrifuge containing a multitude of small orifices, projected under the action of the centrifugal force towards the peripheral wall of the centrifuge and is released therefrom through the orifices in the form of filaments. On exiting the centrifuge, these are drawn and driven towards a receiver component by a high speed and high temperature gas current. To ensure the assembly of the fibers with one another in order to obtain an insulation cushion, the fibers are treated with a so-called, glue composition which contains a heat-hardenable resin. The cushion of treated fibers is then subjected to heat treatment in a drying chamber so as to polymerize the resin and obtain an insulation product having the desired properties, such as resilience, stability in size, traction resistance, thickness recovery after compression and homogeneous color.

The glue compositions generally contain a heat-hardenable resin. However, glue compositions containing only a heat-hardenable resin would form products with a non-homogeneous color, which are more expensive and would make the method of manufacture more polluting. Therefore, the glue compositions normally used contain an aqueous resin composition acting as the principal binder and glue additives which give the final product suitable properties and satisfy the requirements inherent to the method of manufacture of the product. The resin is generally comprised of phenoplast resins (phenol-formol) or aminoplast resins (melamine-formol).

The treatment of the fibers using the glue composition can be carried out in different ways. For example, the fibers can first be assembled on the receiving component, such as a conveyer, they can be compressed into a cushion and then dipped in an aqueous solution containing phenoplast or aminoplast resins, or mixtures thereof. However, it is necessary to remove the water. The subsequent heat treatment therefore serves to remove the water and to polymerize the resins, which leads to further high energy use.

Therefore, the fibers are preferably treated on exiting the drawing component by spraying them with an aqueous glue composition. The water is then partially evaporated and the subsequent heat treatment is used essentially for the final drying, the polymerization of the resins and the shaping of the cushion of bound fibers.

For such a treatment using spraying, it is necessary to use a glue composition which can be easily sprayed on the fibers. For this purpose, the essential ingredient of the glue composition, i.e., the heat-hardenable resin, must, in addition to good stability over time, have a high rate of dilutability (or water tolerance) in water. This high rate of dilutability also provides the resin with an appropriate gelling time in order to prevent polymerization which is too rapid, enables homogeneous distribution on the fibers and, consequently, provides more uniform gluing of the fibers. The rate of dilutability in water of an aqueous resin solution corresponds to the volume of deionized water which, at a given temperature, can be added to the volume unit of said solution before causing the formation of a permanent cloud.

To obtain glue compositions which are easily sprayable on the mineral fibers, it was thought to use melamine-urea-formaldehyde type resins, which result from a condensation reaction in a basic medium of formaldehyde, urea and then melamine, in the presence of a polyol having a functionality of at least equal to three. These resins are stable over time and can have a dilutability (or water tolerance) at least equal to 1000%. The glue compositions containing these resins are easily sprayable on the mineral fibers, have an appropriate gelling time and enable insulation products to be formed which hold well in heat and have a white color.

While these glue compositions provide insulation products having improved properties, they still have certain disadvantages. First of all, they contain a particular resin (melamine-urea-formaldehyde prepared in the presence of a polyol), the manufacture of which is more expensive than that of other resins of the same type. On the other hand, the fibers, after drawing and treatment with the glue composition, are collected on a receiving component where they form a cushion which can have a sticky character, which prevents sufficient reinflation of the cushion before the heat treatment for the polymerization of the resin. This insufficient reinflation prior to polymerization (pregelling) does not provide a product having good thickness recovery after the compression necessary for the economical stocking and transportation of the products. In addition, it is sought to obtain products having improved mechanical properties, in particular traction resistance.

SUMMARY OF THE INVENTION

The object of the present invention is a glue composition not having the above-identified disadvantages which enables an insulation product with improved properties to be obtained.

In accordance with the invention, the aqueous base composition for the gluing of discontinuous mineral fibers, particularly glass fibers, comprises a heat-hardenable resin, urea, possibly one or several glue additives and, as an additional glue compound, a polymethylol compound with a functionality of at least equal to three.

The polyol used in the invention is of the general type R—C(CH$_2$OH)$_3$ or R—C(CH$_2$OH)$_2$—CH$_2$—O—CH$_2$—(CH$_2$OH)$_2$—C—R' where R and R', which may be identical or different represent a hydrocarbon aliphatic radical which may or may not contain a hydroxyl group.

The polyol is preferably selected from the group formed by pentaerythritol, dipentaerythritol, trimethylolpropane and ditrimethylolpropane.

The resins which can be used in the glue compositions in accordance with the invention can be all suitable heat-hardenable resins, particularly phenolic resins which may or may not be modified with urea and aminoplast resins which may or may not be modified with urea or mixtures of such resins.

The resins preferably used in the invention are resins of the melamine-urea-formaldehyde type having high water dilutability (or water tolerance) capability.

Resins with this characteristic are, for example, those mentioned above which result from a condensation reaction in a base medium of formaldehyde and urea and then melamine in the presence of a polyol having a functionality of at least equal to three, such as described above (which resin is called "Resin A" in the present specification). Suitable resins are those in which the molar ratios F/M and U/M of the number of moles of formaldehyde (F) and urea (U) in relation to the number of moles of melamine (M) are, for F/M from (0.5 U/M+1.5) to (3 U/M/+3) and, for U/M from 0.5 to 5.

The polyol in these resins is present in an amount of 0.2 to 2 moles, and preferably from 0.25 to 0.5 moles, per mole of melamine. For the preparation of these resins, an aqueous solution of formaldehyde and the polyol can, for example, be combined in a first phase at approximately 40° C., and then a base catalyst such as soda can be added. The urea is then added so as to form an intermediate resin, the reaction mixture is brought to approximately 80° C., then further base catalyst is added and then the melamine is added. The temperature is maintained at approximately 80° C. so as to continue the condensation reaction with the melamine, while maintaining an almost infinite water dilutability capability. The mixture is then cooled to approximately 30° C. and, if necessary, the pH of the mixture is adjusted to a value of approximately 9. The resins obtained are stable during stocking and have a water dilutability capability of at least equal to 1000%.

Other resins which can be used for carrying out the invention are formaldehyde-melamine-urea resins (which, in the present specification, are called "Resin B"), which are prepared without a polyol. These resins can have the same F/M and U/M molar ratios as above, but are prepared by a different method. One of the methods consists of placing an aqueous solution of formaldehyde in a reactor, at approximately 40° C., of adding the base catalyst, such as soda, and then of introducing the melamine; the starting formaldehyde/melamine molar ratio (F/M) is preferably from 2.5 to 3.5. The temperature is then increased to approximately 70° C., further soda and then urea are introduced. The temperature is increased until it reaches approximately 80° C., which temperature is maintained so as to continue the reaction, and then the mixture is cooled and the pH is adjusted to approximately 9. This resin has a water dilutability capability of at least equal to 1000%.

The glue composition in accordance with the invention can contain other conventional constituents.

For example, it can contain heat-hardenable phenolic resins of the resol type, which are known to polymerize rapidly at high temperatures without the appearance of undesirable pregelling phenomena.

The glue compositions generally contain urea which serves, in particular, to decrease the amount of free formaldehyde and thus acts as a binder.

The glue compositions can also contain one or several conventional glue additives. These additives are, for example: oil, which acts as a softening and anti-dust agent by preventing the mineral fibers from flying off in the form of dust; ammonia to prevent pregelling of the resin in the fiber formation zone; a catalyst, generally ammonium sulfate, for polymerization of the resin in the drying chamber; and silane which acts as a bridging agent between the resin and the fibers and ensures better behavior after aging of the products which contain it. If necessary, the glue compositions can also contain coloring agents, charges and other chemical agents, such as silicone, so as to render the products hydrophobic.

Certain of the ingredients, other than the resin, cannot be used to adapt the glue to a particular production or to provide specific properties. Thus, where the glue composition is to be applied on products having good fire resistance, little or no oil is used.

The glue compositions are aqueous compositions containing from 1 to 25% of dry extract, and preferably at least 10%.

The glue compositions in accordance with the invention preferably contain, for 100 parts by weight of dry matter, from 70 to 90 parts of resin, from 10 to 30 parts of urea and from 3 to 15 parts of polyol.

Various glue additives can be added to the compositions in accordance with the invention. For 100 parts by weight of dry matter of resin, urea and polyol, the amounts are:

from 0 to 20 parts of oil, generally from 6 to 15 parts, from 0 to 20 parts of ammonia at 20%, and preferably from 3 to 12 parts, from 0 to 5 parts of ammonium sulfate, and preferably from 1 to 3 parts, and from 0 to 2 parts of silane, and preferably from 0.1 to 0.8 parts.

The present invention also relates to a method of manufacture of an insulation product based on discontinuous mineral fibers, particularly glass fibers, in accordance with which filaments are formed, these are treated with a glue composition in accordance with the invention which contains a heat-hardenable resin prior to their reaching a receiving component where they form a cushion, and then the fiber cushion undergoes a heat treatment so as to polymerize the resin.

The method described above, in which the molten matter is introduced into a centrifuge and drawn, at the exit of the centrifuge, by a high speed and high temperature gas current, can be used for example to form said filaments.

The object of the invention is also insulation products. These products can be of any color depending on the subsequent use planned; in this case, the glue composition contains one or several suitable coloring agents. The insulation products treated with a glue composition not containing phenolic resin and coloring agents are white and are particularly desirable since they can be used in various manners; for example, insulating ceiling panels can be mentioned: such products consist of superposing a panel of glued mineral fibers with a film of glass fibers and a simple layer of white paint, which provides the product with its final esthetic appearance.

The products treated with the glue composition in accordance with the invention also have good heat resistance, which renders them useful for the thermal insulation of pipes intended to carry liquids transported at high temperatures, on the order of 400° C.

DETAILED DESCRIPTION OF THE INVENTION

To further appreciate the effects on the finished products obtained with the glue composition in accordance with the invention, certain characteristics of glass fiber cushions impregnated with glue compositions which contained or did not contain the above-defined polyol were studied.

Numerous parameters come into play in the properties of insulating fiber cushions.

Particularly, the fineness of the fibers, the amount of binder calculated as a percentage of the total weight of glued fibers, the color, the traction resistance, the thickness recovery after a given compression and the density should be noted.

The fineness is determined by a so-called micronary measurement, which is defined by standard ASTMD 1448-78. The micronary measurement is determined in the following manner: a sample of the product, normally 5 g, is placed in a compartment traversed by a gas current which is emitted under given conditions, in particular the pressure. The fibers subjected to this current form an obstacle which tends to slow the passage of said gas. The gas flow measurement is taken on a graduated flowmeter. It is these defined values for normal conditions which are taken. The finer the fibers for a same sample weight, the weaker the flow. The micronary measurement is given as F/5 g.

The traction resistance is measured in accordance with standard ASTM-C-681-76. In accordance with this standard, rings of a well-defined size are cut from the fiber cushion. These rings are placed on two cylindrical traction bars. They are submitted to increasing forces. The force exerted at breakage is measured. To obtain comparable results, the force exerted is related to the weight of the sample. The results are expressed in gf/g. The traction resistance is generally measured after manufacture and after aging. Aging is simulated by submitting the sample to the action of water vapor under pressure for 30 minutes in an autoclave at 107° C.

The thickness recovery (RE) measurements are carried out in accordance with standard DIN 18165. The mineral fiber cushion is placed in the drying chamber, where the resin polymerization takes place, between two conformers which force it to a given thickness, which is greater than the nominal thickness, or minimal thickness guaranteed to the user. On exiting the drying chamber, the cushion is compressed for a given period of time, for example to 1/7th of its nominal thickness. The thickness recovered after decompression is measured. The measurement is taken without shaking the fiber cushion. These measurements are expressed as a percentage of the nominal thickness.

The following examples are given as indicative to illustrate the invention.

EXAMPLE 1

An aqueous glue composition with 2% dry material was prepared by mixing an aqueous composition of formaldehyde-melamine-urea resin (Resin B), urea and pentaerythritol as the polyol. The resin was a Resin B obtained as indicated above, with the F/M and U/M molar ratios being 2.9 and 2.1 respectively and the total amount of base catalyst, soda, introduced in several stages representing 1% of the volume of melamine.

These components were used in proportions, expressed in parts by weight of dry material, of 74 parts of resin, 13 parts of urea and 13 parts of pentaerythritol.

This aqueous composition was sprayed on glass fibers obtained by the known method of centrifugal drawing, before they reached the receiver component. The water contained in the composition was for the most part evaporated due to the high temperature. The treated fibers formed a cushion on the receiving component. This cushion was cut into square panels with sides measuring 550 mm. They were subjected to heat treatment in a drying chamber at 200° C. for approximately 4 minutes in order to polymerize the resin. The product obtained had a white color.

It was subjected to a test for traction resistance, such as defined above, after manufacture and after aging in an autoclave.

The traction resistance measurements, as well as the density, the amount of binder and the fineness of the fibers are given in Table 1.

The considerable difference between the traction resistance values after manufacture and after aging is due to the fact that the glue composition contained no silane. A glue composition with no silane was voluntarily prepared, which compound is known to maintain good properties after aging in damp conditions, so as to increase the effect of the aging in an autoclave.

EXAMPLE 2

Example 1 was repeated, but the glue composition contained no polyol.

The results of the traction resistance measurements are given in Table 1.

By observing the results obtained in these two examples, it was noted that the product treated with a glue composition in accordance with the invention, that is containing a polyol (Example 1) had improved traction resistance after manufacture and after aging in a autoclave.

EXAMPLE 3

An aqueous glue composition with 10% dry material was prepared from 80 parts of formaldehyde-melamine-urea resin (Resin B described in Example 1), 10 parts of urea and 10 parts of pentaerythritol, said quantities being expressed in parts by weight of dry material.

The composition further contained, for 100 parts of dry matter of resin and urea, 0.5 parts of silane, such as the A 1100 aminosilane made by Union Carbide, and 6 parts of "Mulrex 91" mineral oil made by Mobil Oil.

The aqueous glue composition was sprayed onto the glass fibers as previously described.

The fiber cushion obtained was subjected to a heat treatment, at 200° C., in a drying tunnel in order to continuously polymerize the resin. A white product was obtained.

The cushion then underwent the traction resistance test, after formation and after simulated aging in damp conditions. The cushion was also subjected to the thickness recovery test. The rate of compression was 7/1. The thickness recovery measurements were made after 24 hours and 3 months of compression. The results of the measurements, as well as the density, the amount of binder and the fineness of the fibers are given in Table 2.

EXAMPLE 4

The method of Example 3 was repeated, but the glue composition contained, in parts by weight of dry material, 85 parts of Resin B, 10 parts of urea and 5 parts of pentaerythritol.

The results of the measurements are given in Table 2.

By studying the results shown in Table 2, it can be noted that by comparing two glue compositions in accordance with the invention (Examples 3 and 4) containing the same Resin B, the composition which contained the highest quantity of polyol (Example 3) provided products with better traction resistance and thickness recovery.

EXAMPLE 5

The method of Example 3 was repeated, but, as the resin, a formaldehyde-urea-melamine resin (Resin A) was used which was prepared as indicated above in the presence of polyol (0.54 mole of pentaerythritol per mole of melamine, molar ratios F/M=6.5 and U/M=2 and soda: 32.2 moles per mole of melamine).

The glue composition contained, in parts by weight of dry material, 76.2 parts of Resin A, 19 parts of urea and 4.8 parts of pentaerythritol. The fineness of the fibers was 2.9 F/5 g. The product obtained had a white color, a density of 6 kg/m$^3$, and an amount of binder of 5.2%. The traction resistance after manufacture was 170 gf/g; and, measured after aging in an autoclave, was 85 gf/g.

EXAMPLE 6

The method of Example 5 was repeated, but the glue composition contained, in parts by weight of dry material, 80 parts of Resin A, 20 parts of urea and no pentaerythritol.

The fineness of the fibers was 2.9 F/5 g. The product obtained had a white color, a density of 6 kg/m$^3$, and an amount of binder of 5.0%. The traction resistances after gelling and after aging in an autoclave were 166 gf/g and 70 gf/g, respectively.

By comparing the results of Examples 5 and 6, it can be seen that the glue composition of Example 5, which contained polyol, enabled the manufacture of a product with a better traction resistance than that treated with the glue composition of Example 6 which contained no polyol.

Obviously, numerous modifications and variations of the present invention are possible in light of the above teachings. It is therefore to be understood that within the scope of the appended claims, the invention may be practiced otherwise than as specifically described herein.

TABLE 1

|  | Example 1 | | Example 2 | |
|---|---|---|---|---|
| Glue composition (parts by weight of dry material) | Resin B | 74 | Resin B | 84 |
|  | Urea | 13 | Urea | 15 |
|  | Polyol | 13 | Polyol | 0 |
| Density (kg/m$^3$) | 15 | | 15 | |
| Amount of binder (%) | 5.0 | | 4.45 | |
| Fineness of the fibers (F/5 g) | 4.8 | | 4.6 | |
| Color | white | | white | |
| Traction resistance (gf/g) | | | | |
| after manufacture | 355 | | 277 | |
| after aging | 167 | | 158 | |

TABLE 2

|  | Example 3 | | Example 4 | |
|---|---|---|---|---|
| Glue composition (parts by weight of dry material) | Resin B | 80 | Resin B | 85 |
|  | Urea | 10 | Urea | 10 |
|  | Polyol | 10 | Polyol | 5 |
| Density (kg/m$^3$) | 6 | | 6 | |
| Amount of binder (%) | 5.2 | | 5.1 | |
| Fineness of the fibers (F/5 g) | 2.8 | | 2.8 | |
| Color | white | | white | |
| Traction resistance (gf/g) | | | | |
| after manufacture | 136 | | 134 | |
| after aging | 77 | | 56 | |
| Thickness recovery (%) | | | | |
| after 24 hours | 121.3 | | 118.1 | |

TABLE 2-continued

|  | Example 3 | Example 4 |
|---|---|---|
| after 3 months | 80.5 | 78.2 |

What is claimed as new and desired to be secured by Letters Patent of the United States is:

1. A base aqueous composition for gluing discontinuous mineral fibers comprising (a) at least one heat hardenable resin, (b) urea and (c) a polymethylol compound having a functionality of at least equal to three, wherein the polymethylol has the formula:

R—C (CH$_2$OH)$_3$ or

R—C (CH$_2$OH)$_2$ CH$_2$—O—CH$_2$—(CH$_2$OH)$_2$—CR—R' where R and R', which may be identical or different, each represent a hydrocarbon aliphatic radical which may or may not contain a hydroxyl group and is selected from the group consisting of pentaerythritol, dipentaerythritol, trimethylolpropane, ditrimethylolpropane and mixtures thereof.

2. The glue composition of claim 1, further comprising at least one additive selected from the group consisting of oil, ammonia, silane, a polymerization catalyst, and mixtures thereof.

3. The glue composition in accordance with claim 1, wherein the heat-hardenable resin is selected from the group consisting of a phenolic resin, a phenolic resin modified with urea, and mixtures thereof.

4. The glue composition in accordance with claim 1, wherein the heat-hardenable resin is an aminoplast resin.

5. The glue composition in accordance with claim 1, wherein the polyol is used in an amount of 3 to 15 parts for 100 parts by weight of dry material of resin, urea and polyol.

6. The glue composition in accordance with claim 4, wherein the resin is the result of the condensation reaction in a base medium of formaldehyde, urea and melamine in the presence of a polyol having a functionality of at least equal to three.

7. The glue composition in accordance with claim 4, wherein the resin is the result of the condensation reaction in a base medium of formaldehyde, melamine and then urea, in the absence of polyol.

8. The glue composition in accordance with claim 6, wherein, in the heat-hardenable resin, the F/M and U/M molar ratios of the number of moles of formaldehyde (F) and urea (U) in relation to the number of moles of melamine (M) are, for F/M, from (0.5 U/M+1.5) to (3 U/M+3) and, for U/M, from 0.5 to 5.

9. The glue composition in accordance with claim 1, wherein it contains, in parts by weight of dry material, from 70 to 90 parts of resin and from 10 to 30 parts of urea and from 3 to 15 parts of polyol.

10. The glue composition in accordance with claim 1, wherein it further contains at least one coloring agent.

11. A method for the manufacture of insulation products based on discontinuous mineral fibers, consisting of forming the fibers, of treating them with a glue composition containing a heat-hardenable resin and of subjecting the fibers treated in this manner to a heat treatment in order to polymerize the resin, wherein the fibers are treated with a glue composition in accordance with claim 1.

12. An insulation product based on discontinuous mineral fibers, wherein the fibers are impregnated with a glue composition in accordance with claim 1.

13. A white insulation product based on discontinuous mineral fibers, wherein the fibers are impregnated with a glue composition in accordance with claim 4.

* * * * *